United States Patent [19]

Hearn

[11] 3,934,672

[45] Jan. 27, 1976

[54] METHOD AND APPARATUS FOR SENSING WHEN A SEISMIC GAS EXPLODER IS IN CONTACT WITH THE EARTH

[75] Inventor: Daniel P. Hearn, Richardson, Tex.

[73] Assignee: Atlantic Richfield Company, Los Angeles, Calif.

[22] Filed: Nov. 25, 1974

[21] Appl. No.: 526,841

[52] U.S. Cl. ............... 181/117; 181/114; 181/401
[51] Int. Cl.² ........................................... G01V 1/06
[58] Field of Search ............ 181/117, 116, 114, 119, 181/401

[56] References Cited
UNITED STATES PATENTS

| | | | |
|---|---|---|---|
| 3,277,977 | 10/1966 | Silverman | 181/114 |
| 3,474,880 | 10/1969 | Gundlach | 181/117 |
| 3,550,719 | 12/1970 | Meister | 181/114 |

Primary Examiner—Maynard R. Wilbur
Assistant Examiner—G. E. Montone
Attorney, Agent, or Firm—Robert M. Betz

[57] ABSTRACT

A seismic gas exploder is coupled to the movable piston of a hydraulic catching system so that the piston is constrained to move with the exploder as it rebounds upward from a shot and then falls back to earth. The weight of the gas exploder is applied through the piston to increase the pressure of the hydraulic fluid in the system when the exploder is moving in a downward direction. A two-position diaphragm actuated pressure switch monitors the fluid pressure, the position of the switch contacts being effective to control an exploder firing circuit or provide other indication of the exploder's position.

13 Claims, 2 Drawing Figures

METHOD AND APPARATUS FOR SENSING WHEN A SEISMIC GAS EXPLODER IS IN CONTACT WITH THE EARTH

BACKGROUND OF THE INVENTION

1. Field of the Invention

This invention relates generally to the field of geophysical prospecting and more particularly to a method and apparatus for sensing when a seismic gas exploder is in contact with the earth.

2. Description of the Prior Art

The invention to be described is of primary interest in connection with the control and operation of so-called seismic gas exploders. Typically, these are devices resting on the ground wherein a gas explosion takes place within an expansible chamber formed between a bottom impact mass and a movable piston assembly causing the impact mass to move downwardly to generate a seismic wave within the earth. The piston assembly moves in an opposite direction, followed by the upward rebound of the entire exploder housing. When operating such exploders, the possibility exists that the exploder may be fired when it is not in contact with the earth. Some versions of gas exploders cannot withstand such a stress safely. Furthermore, the resultant seismic pulse may differ substantially from one generated when the exploder interfaces the earth. Thus, there is a need for indicating reliably when the exploder has returned to earth so that such firing does not occur prematurely, for example as a result of malfunction or by attempting to employ a firing sequence more rapid than the system can tolerate.

As a corollary to the above, the Applicant has appreciated that it would be advantageous if a gas exploder could be made self-actuating so that its contact with the earth after firing would automatically trigger the next firing sequence. This would eliminate the need for a separate timer for controlling the firing circuit.

SUMMARY OF THE INVENTION

It is, therefore, the general object of this invention to provide a method and apparatus for sensing when a gas exploder is in contact with the earth.

It is a further object of this invention to provide a method and apparatus for inhibiting or disabling the firing circuit of a seismic gas exploder when the exploder is not in contact with the earth.

It is a still further object of this invention to provide a method and apparatus for automatically actuating the firing circuit of a seismic gas exploder at the instant of its return to earth from a previous shot.

Other objects and advantages of the method and apparatus of this invention will become apparent to those skilled in the art from a consideration of the detailed description hereinafter set forth and from the accompanying drawings and appended claims.

In accordance with the preferred embodiment of this invention, a seismic gas exploder is dependently attached to the rod of a piston movable within an upstanding hydraulic catcher cylinder suitably affixed to a supporting frame so that the piston and the gas exploder are constrained to move together. The cylinder is formed as an integral part of a catcher system wherein movement of the piston in one direction responsive to the upward rebound of the gas exploder is essentially without restraint, while motion in the opposite direction of said piston responsive to the fall of said exploder is damped by the passage of hydraulic fluid through a metering orifice. As the gas exploder falls from its maximum rebound height, its weight is applied through the piston to increase the pressure of the hydraulic fluid in the system. A flexible diaphragm is positioned in the wall of a fluid return conduit interconnected between opposite sides of the piston and controls the setting of a two-position pressure switch so as to monitor the internal fluid pressure. The pressure switch is designed to control the operation of an output device such as a capacitor discharge firing circuit for the gas exploder. As soon as the diaphragm senses a significant pressure increase due to the weight of the exploder, the pressure switch shifts from a first spring-biased position in which the firing circuit is ready to a second position disabling said circuit. Return of the exploder to the ground returns the pressure switch to the first position to enable passage of a signal through the firing circuit to ignite an explosive mixture.

DESCRIPTION OF THE PREFERRED EMBODIMENTS

Figure 1:
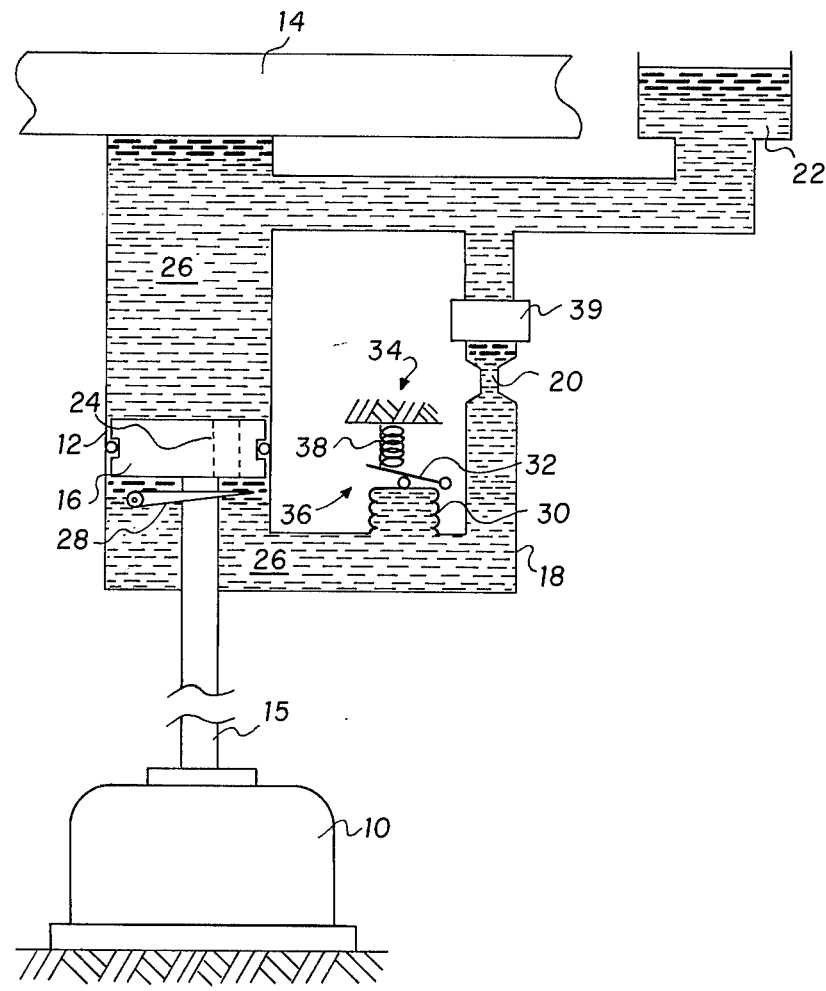
FIG. 1 is a diagrammatic view of an apparatus in accordance with this invention.

In accordance with the preferred embodiment of the apparatus of this invention, a seismic gas exploder 10 resting on the ground 11 is interconnected with an upstanding hydraulic catcher cylinder 12 which is in turn affixed to a supporting frame 14, which may be either stationary or truck mounted. The gas exploder 10 may consist generally of any of various types adapted to impart a downwardly directed seismic pulse into the ground 11 and then rebound upwardly responsive to the reaction force. The gas exploder 10 is suitably fastened to the lower end of a piston rod 15 projecting downwardly from a catcher piston 16 movable within the catcher cylinder 12. The upper and lower ends of fluid bypass conduit 18 are respectively interconnected with the catcher cylinder 12 above and below the piston 16. At a position intermediate the upper and lower ends of the conduit 18, a metering tube or orifice 20 is positioned so as to restrict fluid flow therethrough. An oil reservoir or accumulator 22 also intercommunicates with the bypass conduit 18.

A channel 24 extends in an axial direction through the piston 16 so that when the exploder 10 rebounds in an upward direction from a seismic shot, fluid 26 flows essentially without restraint through the channel 24 in a downward direction. When the exploder 10 reverses direction and starts to fall, a flapper valve 28 positioned behind the piston 16 shuts off the lower opening of channel 24 so that fluid 26 is forced to return slowly to the upper part of the cylinder 12 through the restricting orifice 20 in the conduit 18 thereby damping the motion of exploder 10. The reservoir 22 stores excess hydraulic fluid 26 on the upward stroke of the piston 16 and returns such excess fluid to the system on the downward stroke thereof.

Turning now to the features more particularly concerned with this invention, a flexible diaphragm 30 may be positioned in a wall of the conduit 18 so that it is responsive to pressure in the fluid 26. The diaphragm 30 is adapted to operatively engage a pivotable contact arm 32 of a dual position pressure switch 34 normally urged against fixed contact 36 by means of spring 38.

As the exploder 10 falls and the flapper valve 28 closes due to upward pressure of fluid 26, the weight of the exploder 10 rests on the piston 16 and is transmitted thereby to increase the pressure of the hydraulic fluid 26 beneath the piston 16 from a few psi to a substantial value, for example 100 psi or more. As the pressure in the fluid 26 increases, the diaphragm 30 moves and exerts a force to separate arm 32 and contact 36. This condition persists until such time as the exploder 10 returns to earth so that its weight no longer rests on the piston 16. In this manner, therefore, the condition of the exploder 10 with respect to earth contact is automatically and continuously sensed and monitored.

Clearly the diaphragm 30 and pressure switch 34 may be designed so that arm 32 and contact 36 will separate at any predetermined pressure. In this manner, an indication may be received when any predetermined percentage of the weight of the exploder 10 is supported by the earth 11.

Figure 2:
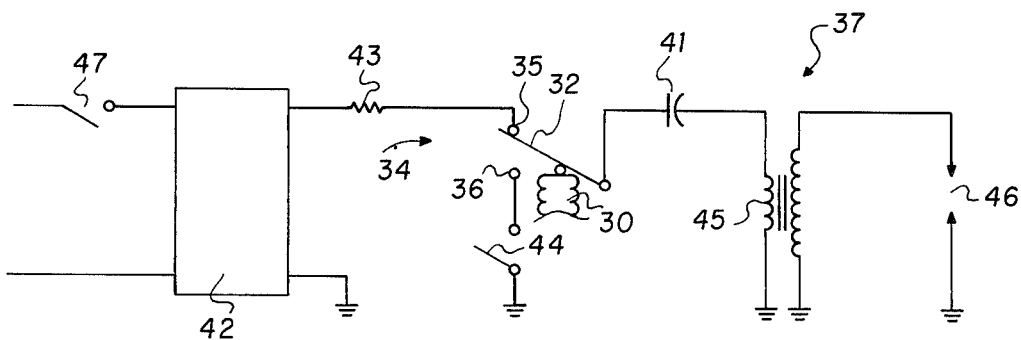
FIG. 2 is a circuit diagram illustrating electric connections for a preferred embodiment of this invention.

It is desirable, particularly in repetitive operation of the exploder 10, to insure that a firing signal is not provided thereto in accordance with known techniques until exploder 10 has been returned to the earth. To this end, the pressure switch 34 may be positioned to control the operation of a conventional firing circuit 37 as more particularly exemplified in FIG. 2, which is illustrative of known commercial circuits such as, for example, the Delta Products type Mark X capacitor discharge firing circuit, as will now be explained.

In a typical operation, the gas exploder 10 may be truck mounted and transported in a raised position preparatory to firing. The exploder 10 can be initially lifted to such a position by firing or by means of separate hydraulic means (not shown), well-known in the art, adapted to inject additional fluid 26 beneath the piston 16. A solenoid valve 39 (FIG. 1) is actuated to block fluid return through the conduit 18, thus holding the exploder 10 in the raised position. In this position the weight of exploder 10 applies pressure to fluid 26 and diaphragm 30 urges the contact arm 32 away from contact 36 and against contact 35. This completes a charging circuit for capacitor 41 from power supply 42 through a resistance 43. When it is desired to fire the exploder 10, the solenoid valve 39 may be actuated to lower it again to the ground, permitting spring-biased contact arm 32 to again engage contact 36. A firing signal may be provided by a well-known means to close a switch such as tone control switch 44. This enables the capacitor 41 to discharge through the primary of the spark coil 45 to yield a high voltage across the secondary thereof and to generate a hot spark across the gap 46. This spark in turn is suitable for ignition of an explosive mixture within the exploder 10. The firing circuit 37 will be disabled as long as switch contact arm 32 and contact 36 are separated, which indicates a continued high pressure in fluid 26 and an above-ground condition of the exploder 10.

An alternate mode of operation can be achieved by maintaining the switch 44 in a closed position. In that event, the capacitor 41 will discharge to provide a spark at gap 46 automatically when the exploder 10 reaches the earth. During the rebound of the exploder 10 to its maximum height, the diaphragm 30 is not under pressure and consequently the charging circuit for the capacitor 41 is not completed. However, during the downward stroke of the exploder 10 and the piston 16, the pressure switch 34 is actuated to again move arm 32 against contact 35 so that the capacitor 41 has adequate time to charge before the exploder 10 returns to earth. It is understood, of course, that the above cycle of operation will be coordinated in a well-known manner with an explosive mixture filling operation. For safety purposes, the capacitor charging circuit is interruptable by means of a switch 47 as shown.

Those skilled in this art will have no difficulty in envisaging other purposes in connection with the operating cycle of seismic gas exploders wherein it will be advantageous to have a simple and effective means of determining when the exploders have fully or partially returned their weight to the ground.

It should also be pointed out that although the invention has been described and illustrated with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. In a system for generating seismic energy by means of a gas exploder of the type adapted to apply a downwardly directed pulse to the earth and which is driven upwardly by the resultant reactive force, the method of determining when the gas exploder is in contact with the earth, comprising the steps of:
   a coupling the gas exploder to the movable piston of a hydraulic cylinder so that said gas exploder and said piston are constrained to move together,
   b applying the weight of said gas exploder through said piston to increase the pressure of the fluid in said hydraulic cylinder when said gas exploder moves in a downward direction from its maximum rebound height, and
   c continuously sensing the pressure in said fluid to thereby permit an indication when said pressure increase is relieved and the weight of said gas exploder is again substantially supported by the earth.

2. The method of claim 1 wherein said step of sensing the pressure in said fluid further comprises providing means movable in response to variations in said fluid pressure adapted to shift a dual position pressure switch from a first position to a second position at a preselected threshold value of said fluid pressure.

3. A method as in claim 2 including the further step of including said pressure switch in a firing circuit for said gas exploder so as to ready a firing circuit for said gas exploder in said first position of said pressure switch and to disable said firing circuit in said second position.

4. In a system for generating seismic energy by means of a gas exploder of the type adapted to apply a downwardly directed pulse to the earth and which is driven upwardly by the resultant reactive force, the improvement comprising:
   a a support structure,
   b a hydraulic cylinder fixed to said support structure and having a piston movable therein,
   c a quantity of hydraulic fluid in said cylinder,
   d means for coupling said gas exploder to said piston so that the weight of said gas exploder is exerted through said piston during the fall of said exploder to increase the pressure in said fluid, and
   e means for sensing the pressure in said fluid to determine when said pressure increase has been relieved by the return of said exploder to earth.

5. Apparatus as in claim 4 wherein said hydraulic cylinder is in axial alignment with said gas exploder.

6. Apparatus as in claim 4 wherein said gas exploder is dependently connected to the piston of said hydraulic cylinder by means of a piston rod.

7. Apparatus as in claim 4 wherein said pressure sensing means comprises a dual position pressure switch for controlling the operation of an external signal circuit, said pressure switch being normally biased in a first position to ready said circuit and means intercommunicating with said fluid adapted to move said pressure switch to a second position responsive to said pressure increase to disable the operation of said external circuit.

8. Apparatus as in claim 7 wherein said means intercommunicating with said fluid is a pressure sensitive diaphragm.

9. Apparatus as in claim 8 wherein a fluid return conduit is interconnected with said cylinder on opposite sides of said piston and wherein said pressure sensitive diaphragm is integral with a wall of said fluid return conduit.

10. Apparatus as in claim 7 wherein said external signal circuit is a firing circuit adapted to operate said gas exploder.

11. Apparatus as in claim 10 wherein said firing circuit is completed through said pressure switch in said first position by closure of a radio controlled electronic switch.

12. Apparatus as in claim 10 wherein said firing circuit is completed through said pressure switch in said first position.

13. Apparatus as in claim 7 wherein said pressure switch is adapted to move from said first position to said second position when said fluid pressure exceeds a predetermined value.

* * * * *